(12) United States Patent
Nielsen et al.

(10) Patent No.: US 6,805,455 B2
(45) Date of Patent: Oct. 19, 2004

(54) WIRELESS REMOTE CONTROLLED MIRROR WITH INTEGRAL LIGHTING

(75) Inventors: Erik R. Nielsen, Issaquah, WA (US); John H. Moselage, Carnation, WA (US); Gordon Keller, Yakima, WA (US)

(73) Assignee: N-K Enterprises, LLC, Yakima, WA (US)

( * ) Notice: Subject to any disclaimer, the term of this patent is extended or adjusted under 35 U.S.C. 154(b) by 142 days.

(21) Appl. No.: 10/306,966

(22) Filed: Nov. 27, 2002

(65) Prior Publication Data

US 2003/0086191 A1 May 8, 2003

Related U.S. Application Data

(63) Continuation-in-part of application No. 09/895,148, filed on Jun. 29, 2001, now Pat. No. 6,585,384.

(51) Int. Cl.$^7$ .............................................. G02B 7/182
(52) U.S. Cl. ....................................... 359/877; 362/488
(58) Field of Search ................................ 359/838, 843, 359/844, 872, 877; 362/488–494

(56) References Cited

U.S. PATENT DOCUMENTS

| | | | |
|---|---|---|---|
| 4,702,572 A | 10/1987 | Cossey | 350/639 |
| 4,779,168 A * | 10/1988 | Montgomery | 362/543 |
| 5,056,905 A | 10/1991 | Jensen | 359/843 |
| 5,576,898 A | 11/1996 | Rubin | 359/841 |
| 5,971,549 A | 10/1999 | Cruickshank | 359/843 |
| 6,039,455 A | 3/2000 | Sorenson | 362/142 |
| 6,120,155 A | 9/2000 | Brennan et al. | 359/857 |
| 6,270,227 B1 | 8/2001 | Tsuyama | 359/871 |

OTHER PUBLICATIONS

"Baby Night Sight." 2002. 1 pg. Available http//www.safe-fit.com/2002/products/50044.htm.

* cited by examiner

*Primary Examiner*—Mark A. Robinson
(74) *Attorney, Agent, or Firm*—Ronald M. Anderson

(57) ABSTRACT

A wireless remote controlled mirror having lights to illuminate a subject being viewed in the mirror, while enabling a user to selectively adjust a view of the subject from a remote location. When attached to a rear seat of a vehicle, the mirror can be remotely adjusted to view a child in a rear-facing safety seat. The mirror includes a base adapted to mount to an object, a reflective lens that moves relative to the base, one or more electric motors to drive the reflective lens, and a receiver that detects a command signal from a wireless remote controller and energizes a motor to reorient the reflective lens to view the child. A plurality of light sources are selectively energized to emit light toward the subject, so that the mirror is usable after dark. The mirror can alternatively be mounted on other portions of a vehicle.

28 Claims, 17 Drawing Sheets

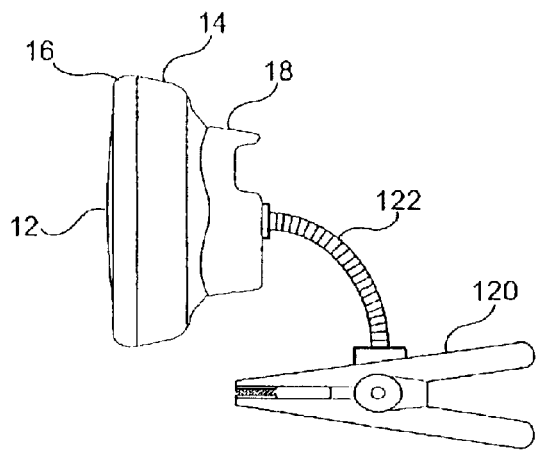
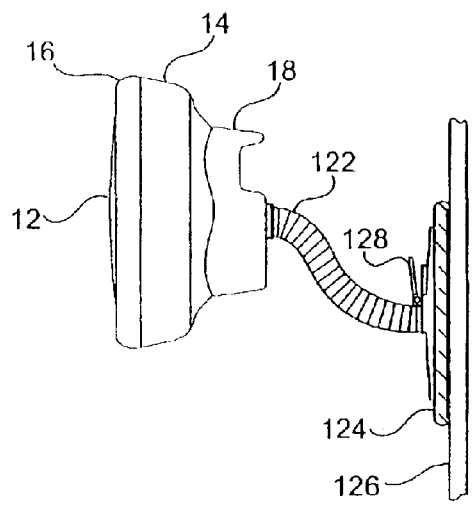
FIG. 11  FIG. 12
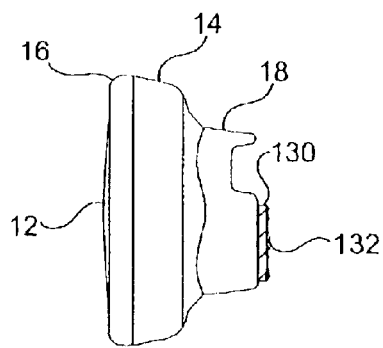
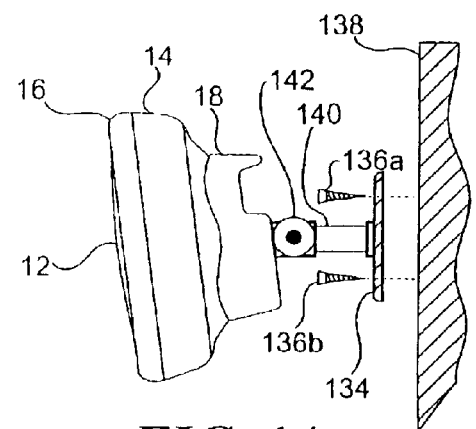
FIG. 13  FIG. 14
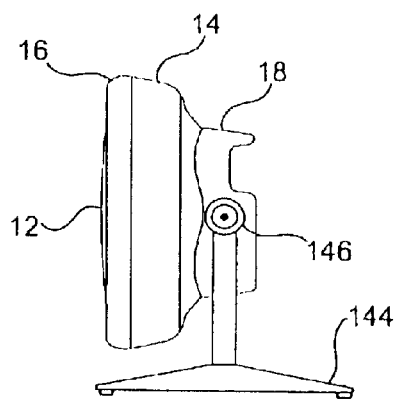
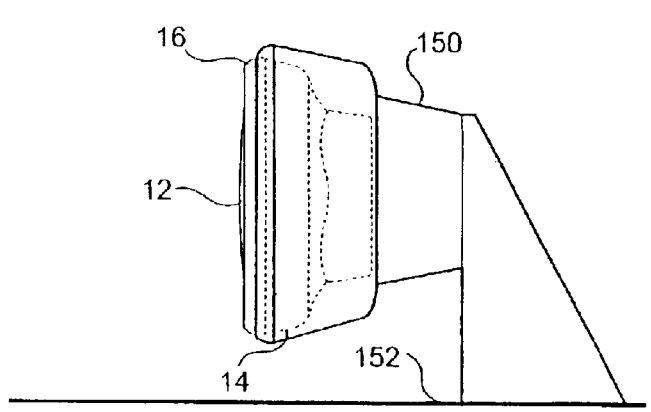
FIG. 15  FIG. 16

WIRELESS REMOTE CONTROLLED MIRROR WITH INTEGRAL LIGHTING

RELATED APPLICATIONS

This application is a continuation-in-part of a commonly assigned application Ser. No. 09/895,148, which was filed Jun. 29, 2001, now U.S. Pat. No. 6,585,384, the benefit of the filing date of which is hereby claimed under 35 U.S.C. §120.

FIELD OF THE INVENTION

The present invention generally relates to apparatus and a method for selectively changing the orientation of a mirror, and more specifically, to mirror with integral light sources that is mounted in or on a vehicle and which employs a wireless remote control for changing the field of view of the mirror.

BACKGROUND OF THE INVENTION

A variety of manually controlled mirrors are typically provided on vehicles, including an interior overhead rear-view mirror, one or more side-view mirrors, and visor mounted vanity mirrors. Another mirror now sold for use in a vehicle is intended for monitoring a child strapped into a rear-facing child car seat. This mirror is mounted and manually positioned so as to enable a driver (or other person) seated in the front seat to view the reflection of a child seated in the rear-facing child car seat by looking at the reflection of that mirror in the conventional overhead rear view mirror.

Several patents have been issued that are directed to mirrors for viewing an infant sitting in a car seat facing toward the rear. For example, U.S. Pat. No. 6,120,155 (Brennan et al.) discloses a clamping arrangement for attaching a child monitoring mirror to the back cushion of the rear seat in a vehicle. Similarly, U.S. Pat. No. 6,039,455 (Sorenson) discloses an infant observation mirror that is attached to an infant car seat to enable a driver to view the infant in the conventional interior rear-view mirror. A roof-mounted mirror that is intended for use in conjunction with the conventional interior rear-view mirror for viewing an infant is disclosed in U.S. Pat. No. 5,576,898 (Rubin). The roof-mounted mirror is hinged so that it can be folded up into the head liner and can also be used by a passenger sitting in the rear seat as a conventional vanity mirror. Finally, U.S. Pat. No. 4,702,572 (Cossey) discloses a mirror that is mounted to the back cushion of a rear seat for viewing an infant and which has an adjustable post secured by a pin for controlling the height of the mirror. The mirror is mounted using a spring-loaded bracket that extends over the top back portion of the rear seat cushion in a vehicle.

It would be desirable to enable a user to remotely control the orientation or field of view of a mirror used for viewing an infant. Although the prior art devices noted above enable a driver to manually adjust the orientation of a mirror to enable a rear-facing child to be viewed, such manually adjusted mirrors can readily move out of position due to vibration of the automobile or motion of the supporting seat. The child can also change position sufficiently in a car safety seat so as to be outside the field of view of the driver. To correct the mirror position, a driver should stop the vehicle, and enter the back seat of the vehicle to make an adjustment, return to the driver's seat in order to check the view, and repeat these steps, if necessary, until the proper mirror orientation is achieved, and then continue driving. Within a short time, the mirror may again need to be readjusted due to automobile vibration, supporting seat movement, a child or toy hitting the mirror, or other disturbances to the mirror or child's position. It would be unsafe for the driver to adjust such mirrors while driving, and leaning over the front seat to reach the mirror is often not possible, particularly for a short driver. Thus, it would be very desirable to enable a user to remotely readjust the orientation of a mirror with a wireless controller, without leaving the front seat. The adjustment of a remote controlled mirror could safely be accomplished while stopped at a stop sign or stop light.

If a remotely controlled mirror is provided for viewing a child or for other purposes on a vehicle, it would be desirable to provide a user full control over the angular position of the mirror about one or both of the X and Y axes. Such a mirror could be used in many other applications besides viewing an infant. For example, an exterior wireless remote controlled mirror could be mounted on one or both sides of the vehicle that was purchased without exterior side mirrors, or to replace manually adjusted side mirrors. Use of such a wireless remote controlled mirror would eliminate the expense and difficulties of routing direct wire connections between a position controller and the mirror, and would enable greater flexibility in relocating and readjusting the mirror for various purposes.

After dark, it may be difficult to view an infant in a rear-facing seat using a mirror. Interior lighting installed in a vehicle is typically not readily directed toward a child strapped into a rear-facing seat, and the child may not be clearly visible when viewed in a mirror in a poorly lighted vehicle interior. The prior art has attempted to address this problem by providing a separate light source mounted on the end of an adjustable elongate stalk. A remote control enables the light source to be energized when needed to view the child. The elongate stalk may be twisted and positioned as required to direct light from the light source toward the child, but the base may move about and the position of the light source may be thrown out of adjustment if the vehicle hits a bump or if the elongate stalk or light source is inadvertently bumped. Also, the light source is a separate component, which must be positioned separately, each time that a child-viewing mirror is re-installed in a vehicle. Attempting to reposition the light source while driving a car can create a safety hazard.

Motorized side-view mirrors are often provided as factory installed options on vehicles. However, these motorized mirrors are controlled by a factory installed four-position switch that is hardwired to the mirror by a factory installed wiring harness. The four-position switch is typically located near the driver and if two side mirrors are provided, typically includes a selector switch so that the driver can determine whether the left or right side mirror is controlled by the four-position switch. These switches are connected to the vehicle's electrical system and hardwired to the side mirrors. If a vehicle was purchased without the motorized adjustable side mirrors, there is typically no easy way to retrofit the vehicle with after market add-on mirrors of that type. Thus, it would be desirable to provide wireless remotely controlled side mirrors that can be retrofitted without the need for installing hardwired switches and complex wiring harness.

One remotely adjusted side mirror is disclosed in U.S. Pat. No. 5,056,905 (Jensen). In this invention, which is intended for use on a truck and trailer, a transmitter is mounted at a rear corner of a trailer and directs a signal at an acute angle outwardly from the side of the trailer toward the front of the vehicle. When the truck turns relative to the trailer, the signal from the transmitter is received by a receiver in the outwardly extending rear-view mirror, causing the mirror to change angular position horizontally so that more of the area to the side of the trailer is visible to the driver. When the truck and its trailer are again generally aligned, the signal from the transmitter is no longer incident on the receiver, and the mirror then returns to its normal position in which it shows less of the area to the side of the trailer and more of the area to the rear. In a second embodiment, the transmitter is selectively controlled in response to a steering gear position. However, each embodiment disclosed by Jensen automatically adjusts the position of the mirror in response to the orientation of the vehicle, and not under the control of the user.

Accordingly, it will be apparent that there is a definite need for a wireless remote controlled mirror for use in various vehicle applications. Such a mirror could be used for viewing a child, as a new or replacement side mirror, or as an auxiliary mirror for extending the view of different portions of the environment around a vehicle. For example, an auxiliary mirror that is capable of wireless remote control could be very useful in extending the view of the road when towing a trailer or carrying loads that block the normal rear view mirror view. The ability to remotely adjust the orientation and view of such a mirror with a wireless control would enable the mirror to be positioned where optimum benefit can be achieved, without requiring any wiring to be installed (if a battery supply is provided on the mirror), or if it is desirable to supply vehicle power to the mirror, by providing only a single power lead to the mirror.

SUMMARY OF THE INVENTION

In accord with the present invention, a wireless remote controlled mirror is defined that includes a base adapted to attach to an object, a prime mover mounted on the base, and a reflective lens mounted in a housing and drivingly coupled to the prime mover. In addition, a light source supported by the base is selectively energized to emit light. A receiver in electrical communication with the prime mover is adapted to couple to an electrical power source and to detect a wireless command signal from a remote controller that is activated by a user. The receiver thus controls the prime mover in response to the wireless command signal, to cause the prime mover to drive the reflective lens to a desired orientation.

The light source preferably comprises a plurality of discrete spaced-apart light emitting sources, e.g., light emitting diodes (LEDs) that emit substantially white light. The one or more light sources are disposed in the housing in which the reflective lens is mounted, so that the light sources move with the reflective lens when driven by the prime mover.

The receiver includes a control circuit to selectively activate the light source in response to the wireless command signal. A timer circuit is optionally employed to deactivate the light source after a predefined time interval, so that when selectively activated, the light source only remains energized for the predefined interval. Electrical current to energize the light source and other components of the wireless remote controlled mirror is provided by battery power supply that provides electrical current to energize the prime mover, the receiver, and the light source, and/or by removably coupling the wireless remote controlled mirror to an external power source, such as the electrical system of a vehicle.

The base is adapted to attach to one of a fixed and a removable component used with a vehicle, enabling a front-facing driver of the vehicle to remotely control the reflective lens to view a rear-facing passenger disposed behind a front seat of the vehicle, when the reflective lens is remotely controlled to achieve the desired orientation. The light source is selectively energizable to illuminate the rear-facing passenger.

An additional prime mover is preferably mounted to the base and is in electrical communication with the receiver. The prime movers pivot the reflective lens and the light source about a first axis and a second axis that is generally orthogonal to the first axis, in response to the wireless command signal. The receiver comprises one of a radio frequency receiver, an infrared receiver, a microwave receiver, and an optical receiver.

The remote controller includes a power supply and a wireless transmitter connected to the power supply. A light source switch is connected between the power supply and the wireless transmitter, such that when the light source switch is activated, the wireless transmitter transmits the wireless command signal to the receiver to cause the light source to be energized. A position switch is connected between the power supply and the wireless transmitter, such that when the position switch is activated, the wireless transmitter transmits the wireless command signal to the receiver indicating a direction in which the reflective lens and the light source are to be moved.

Another aspect of the present invention is directed to a method for controllably positioning a mirror and a light source that is coupled to the mirror, relative to a base. The method includes steps that are generally consistent with the functions of the apparatus described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 11 is a side elevational view of the wireless remote controlled mirror showing a clamp for use in mounting the mirror to an object;

FIG. 12 is a side elevational view of the wireless remote controlled mirror showing a suction cup for use in mounting the mirror to an object;

FIG. 13 is a side elevational view of the wireless remote controlled mirror showing the use of an adhesive layer for mounting the mirror to an object;

FIG. 14 is a side elevational view of the wireless remote controlled mirror showing a mounting plate and fasteners for use in mounting the mirror to an object;

FIG. 15 is a side elevational view of the wireless remote controlled mirror showing a stand for supporting the mirror;

FIG. 16 is a side elevational view of the wireless remote controlled mirror mounted as a side rear-view mirror on a vehicle exterior surface;

DESCRIPTION OF THE PREFERRED EMBODIMENT

Figure 1:
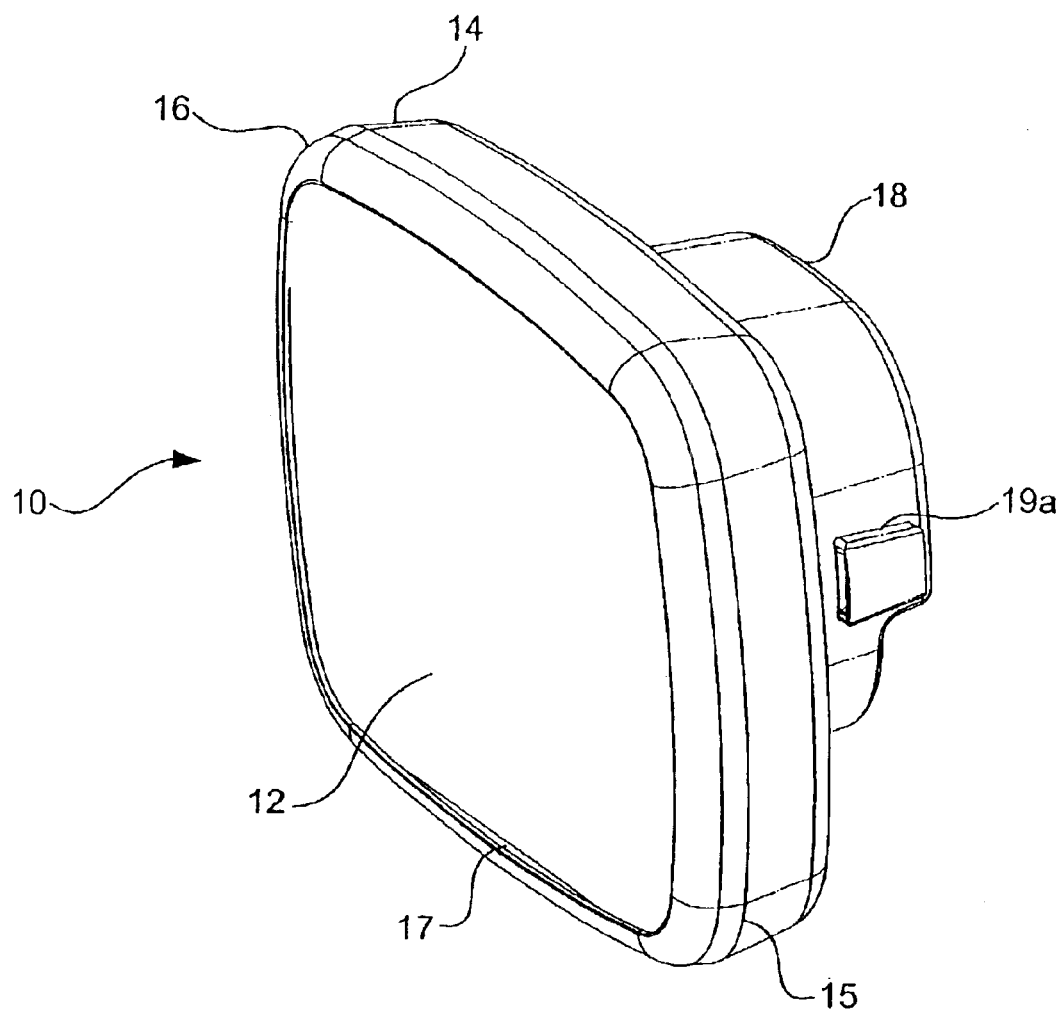
FIG. 1 is an isometric view of a preferred embodiment of the present invention.

FIG. 1 is an isometric view of a preferred embodiment of the present invention. A wireless remote controlled mirror (hereinafter referred to simply as "mirror") 10 includes a reflective lens 12 that is preferably comprised of a glass or plastic with a reflective coating, e.g., a silver coated glass sheet or an aluminum coated MYLAR plastic. Reflective lens 12 is preferably generally quadrilateral in shape and preferably square. However, those skilled in the art will recognize that reflective lens 12 may be formed in numerous other generally planer geometric shapes, such as circular, rectangular, oval, triangular, or other polygon, or as a further alternative, can be a curved shape (i.e., not necessarily having a specific geometrical shape). Similarly, those skilled in the art will recognize that the surface of reflective lens 12 may be concave or convex. Further, reflective lens 12 may enable wide angle views, close-up views, or distorted views.

Mirror 10 also includes a housing 14, preferably made of a plastic material, having a geometric shape substantially similar to the shape of reflective lens 12. A front outer edge 15 of housing 14 extends around the perimeter of reflective lens 12. Holding reflective lens 12 within housing 14 is a bezel 16. Bezel 16 includes a bezel opening 17 through which reflective lens 12 is visible. Bezel 16 is attached to front outer edge 15 of housing 14, thereby retaining reflective lens 12 within housing 14. Bezel 16 may be attached to front outer edge 15 with an adhesive, fastener, or other conventional attachment means (not shown).

Mirror 10 includes a base 18 to which housing 14 is movably coupled. Base 18 is also preferably fabricated of a plastic material that is injection molded into the general shape of a flat-bottomed cup. Preferably, base 18 has a depth sufficient to contain one or more prime movers and associated circuitry used for receiving a wireless signal to control the orientation of the reflective lens relative to the base. Attached to base 18 is a mounting clip 19a, used to secure mirror 10 to an object. Alternatives for mounting the base to an object are discussed in detail below.

Figure 2:
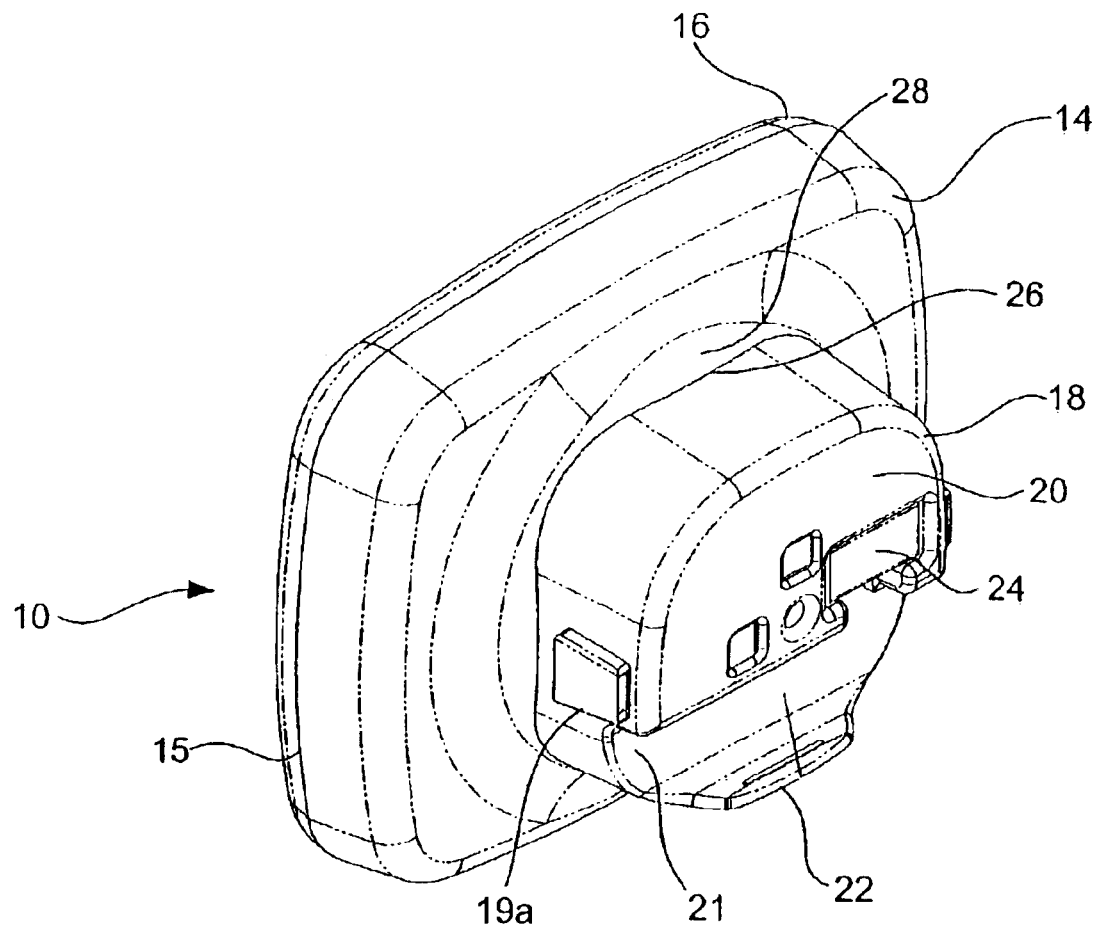
FIG. 2 is an isometric view of a rear portion of the embodiment shown in FIG. 1.

FIG. 2 is an isometric view of a rear portion of a preferred embodiment of the invention. FIG. 2 illustrates that base 18 includes a bottom surface 20 that is formed with a channel 21 and a flange 22 defining one edge of channel 21. Channel 21 is provided to store a remote controller (not shown), for example, when the mirror is removed from a vehicle. Similarly, bottom surface 20 is also formed to include a battery compartment 24 within which a battery (not shown) is installed to provide electrical power to energize the mirror.

Base 18 also includes a contoured edge 26 disposed opposite bottom surface 20. The contoured edges defines an open end of the base within which the housing is movably pivoted, since the shape of contoured edge 26 is designed to accommodate motion of a positioning surface 28 on the rear of the housing 14, opposite front outer edge 15. Contoured edge 26 allows positioning surface 28 to pivot relative to the base, while also minimizing a gap between contoured edge 26 and positioning surface 28. A seal may optionally be incorporated along contoured edge 26 to prevent contaminants from entering the interior of base 18.

Figure 3A:
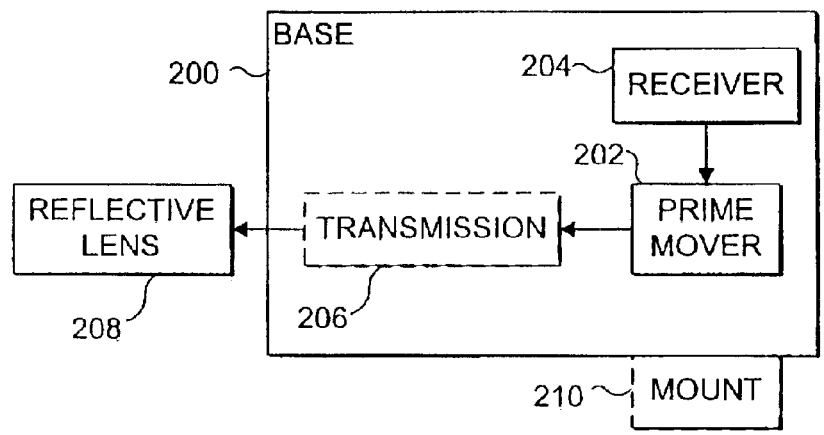
FIG. 3A is a block diagram of one preferred embodiment of the present invention.

FIG. 3A is an overview block diagram of a mirror in accord with the present invention. In this Figure, a base 200 includes at least one prime mover 202, a receiver 204 and an optional transmission 206. Prime mover 202 is attached to base 200 and is drivingly coupled to reorient a reflective lens 208. Optional transmission 206 may be coupled between prime mover 202 and reflective lens 208 to transfer a rotational motion of the prime mover into an angular orientation of the reflective lens about at least one axis in a desired direction. Optionally attached to base 200 is a mount 210 for mounting the wireless remote controlled mirror to an object or surface on or about a vehicle.

Figure 3B:
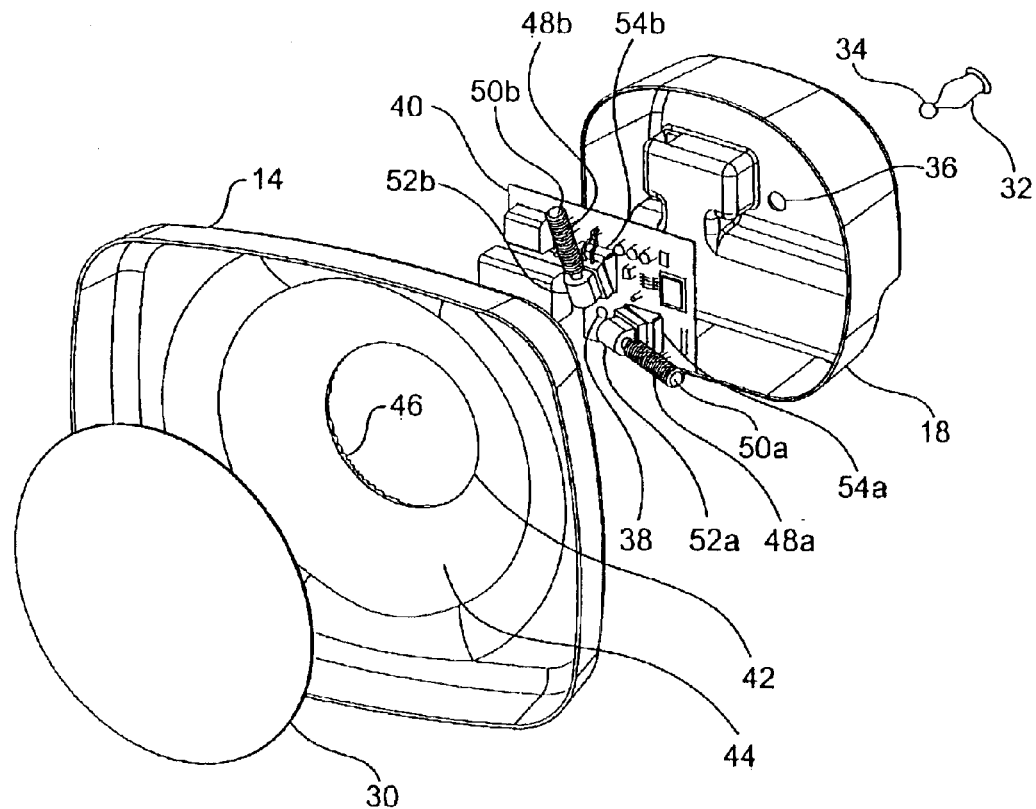
FIG. 3B is an exploded view of the embodiment of the invention shown in FIGS. 1 and 2.
Figure 4:
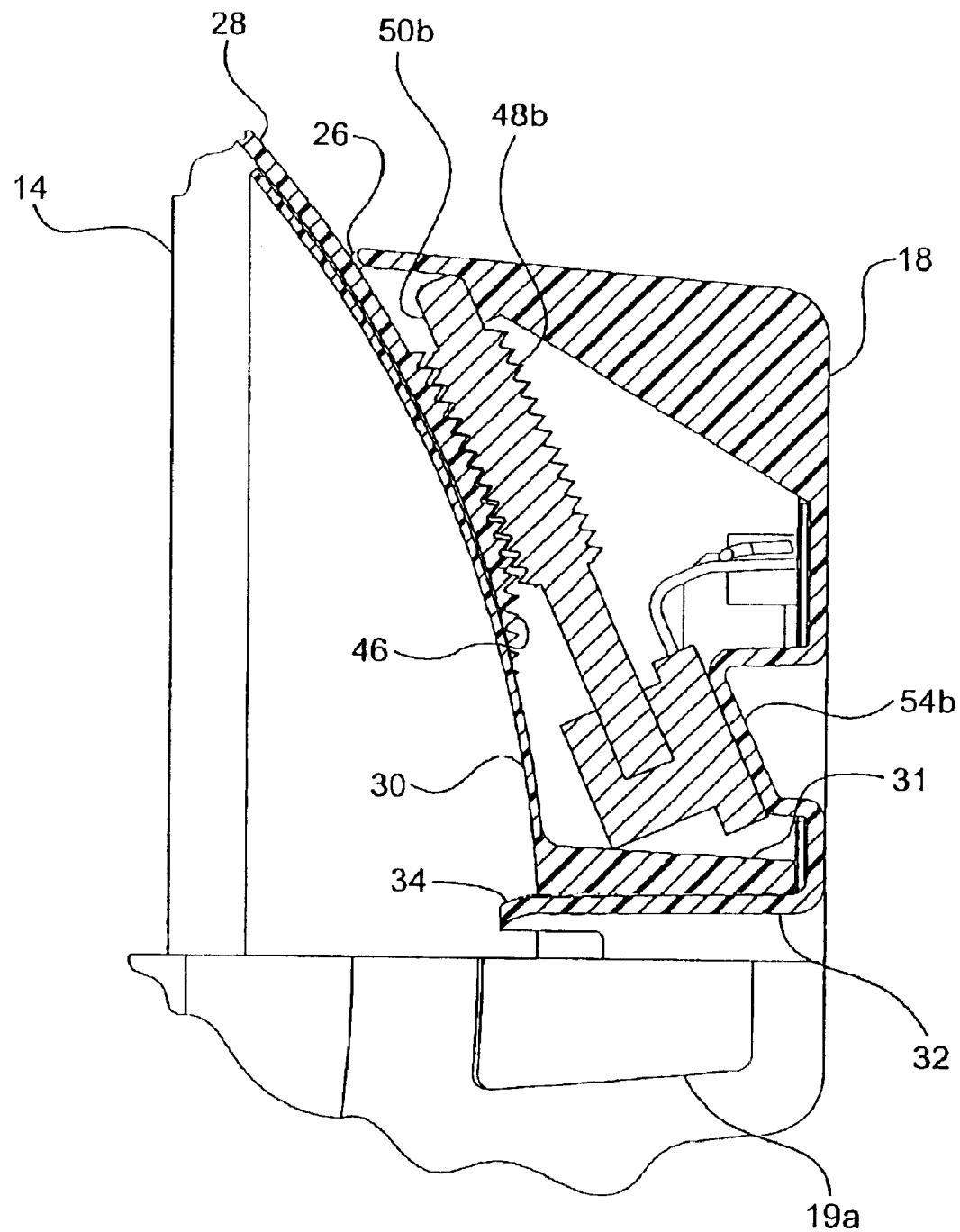
FIG. 4 is a detailed sectional view of a drive mechanism used to pivot the mirror assembly.

In FIGS. 3B and 4 illustrate details of the mechanism used to mount and pivot the reflective lens relative to the base. In FIG. 3B, for the sake of clarity, reflective lens 12 is not shown. Within housing 14 is disposed a dome 30 having a convex rear surface and including a socket 31 (shown in FIG. 4). Socket 31 extends from the center of the convex rear surface of dome 30 through an orifice 42 of positioning surface 28. Socket 31 provides an interference snap fit over a pin 32. Pin 32 has a ball 34 that is inserted through a hole 36 of base 18, and through a hole 38 formed in a circuit board 40. Alternatively, pin 32 may be formed as part of base 18 and extend from the center of the interior portion of base 18. Socket 31 holds the convex rear surface of dome 30 in sliding contact with an inner or front surface 44 of housing 14, which, in turn, maintains positioning surface 28 of housing 14 in sliding contact with contoured edge 26 of base 18. This arrangement of sliding surfaces enables housing 14 to pivot relative to dome 30 and base 18, both of which are stationary as the housing and reflective lens are moved.

Attached to positioning surface 28 of housing 14 are driven threads 46, formed as tracks with the teeth of the threads extending transversely across the width of the tracks. Driven threads 46 engage helical driving threads 48a and 48b of threaded shafts 50a and 50b, respectively.

Motors 52a and 52b drivingly rotate threaded shafts 50a and 50b, respectively. Preferably, the two motors and threaded shafts are oriented to drive housing 14 about orthogonal axes. Motors 52a and 52b are mounted on brackets 54a and 54b, respectively, which are formed as a part of base 18. Alternatively, brackets 54a and 54b are secured to circuit board 40, which is secured to base 18. Motor 52b drivingly rotates threaded shaft 50b so that engagement of helical driving threads 48b with driven threads 46 moves positioning surface 28 of housing 14. Threaded shaft 50b is thus a worm gear that acts on driven threads 46, causing positioning surface 28 of housing 14 to pivotally slide between contoured edge 26 of base 18 and the convex surface of dome 30. Those skilled in the art will recognize that a variety of other driving means may be employed to pivot housing 14, or reflective lens 12. Other means contemplated for coupling one or more prime movers to housing 14 include a ball joint, a universal joint, a linkage bar, a spring, or a cable, but it is clear that still other conventional techniques can be employed in some form of transmission that is used to direct a force applied by a prime mover to moving the housing and the reflective lens about one or two axes.

Figure 5:
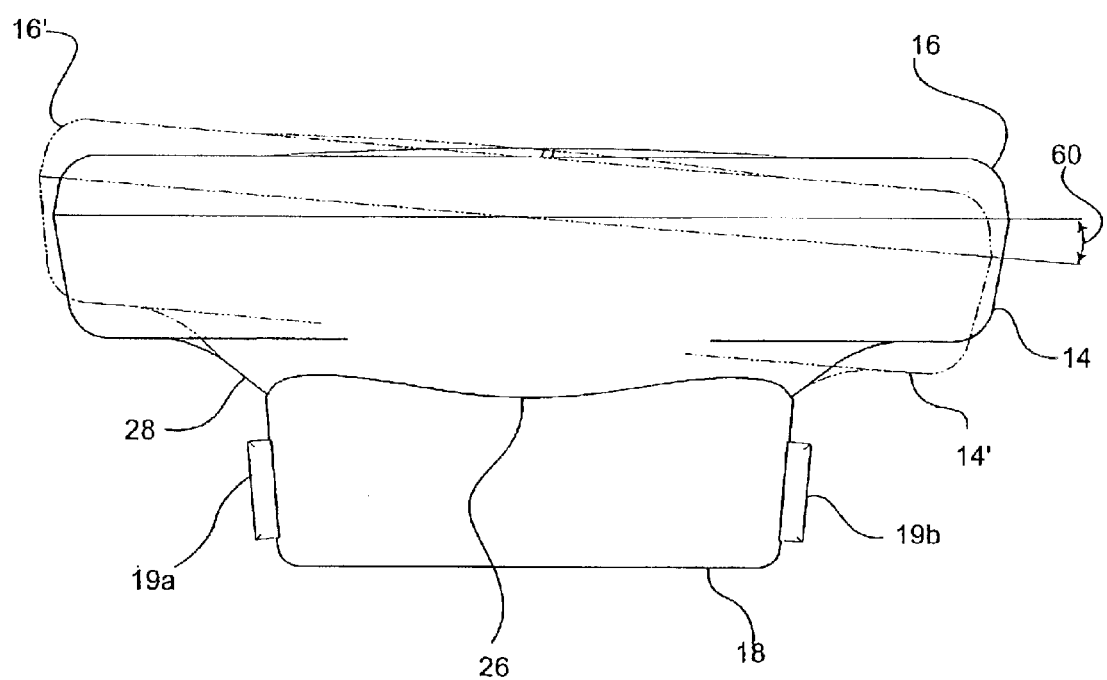
FIG. 5 illustrates the pivoting motion of the mirror assembly relative to the base.

FIG. 5 the pivoting motion of housing 14 about one axis. When one of the motors is activated by a drive signal (discussed below), the threaded shaft by that motor causes housing 14 to pivot through an angle of up to about 60, so that the reflective lens is reoriented to a new position, for example, as illustrated by broken lines delineating housing 14' and bezel 16'. While movement about only one axis is illustrated, it will be apparent that a similar movement about an orthogonal axis (extending from left to right through base 18, as shown in the example of FIG. 5) can also be carried out by energizing the other motor. Both motors can be energized simultaneously to cause movement about both orthogonal axes at the same time, if desired.

Figure 6:
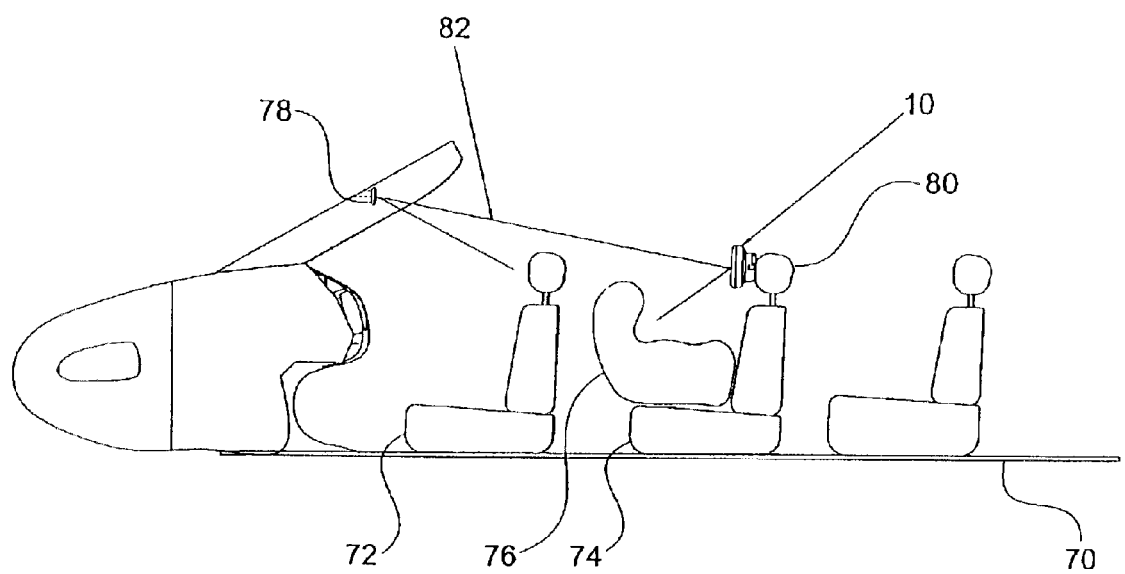
FIG. 6 is a cut-away schematic view of a vehicle illustrating an application of the wireless remote controlled mirror for viewing a child in a rear-facing child safety seat.

FIG. 6 illustrates preferred application of the present invention in which the mirror is employed in a vehicle for viewing a child. An automobile 70 includes a front seat 72 and a passenger seat 74 that is disposed behind front seat 72. Strapped onto passenger seat 74 is a rear-facing child safety seat 76, which designed to support a child facing toward a rear of automobile 70. A driver or other person (not shown) in automobile 70 may use a conventional overhead rear-view mirror 78 to view an area behind front seat 72, but the child is not normally visible in the conventional overhead rear-view mirror, since the child is hidden by the rear-facing child safety seat. Even when turning around, the child will not normally be visible. To solve this problem, mirror 10 is mounted to a headrest 80 that is attached to passenger seat 74. The driver can then view the child inside rear-facing baby seat 76 via a line of sight 82—but only if the orientation of mirror 10 is set so that the reflection of the child in the reflective lens of mirror 10 is visible in the conventional overhead rear-view mirror. As described below, the driver or another person in the front seat may wirelessly, remotely adjust the view or orientation of the reflective lens in mirror 10 while remaining seated and without reaching back to the mirror from front seat 72.

Figure 7A:
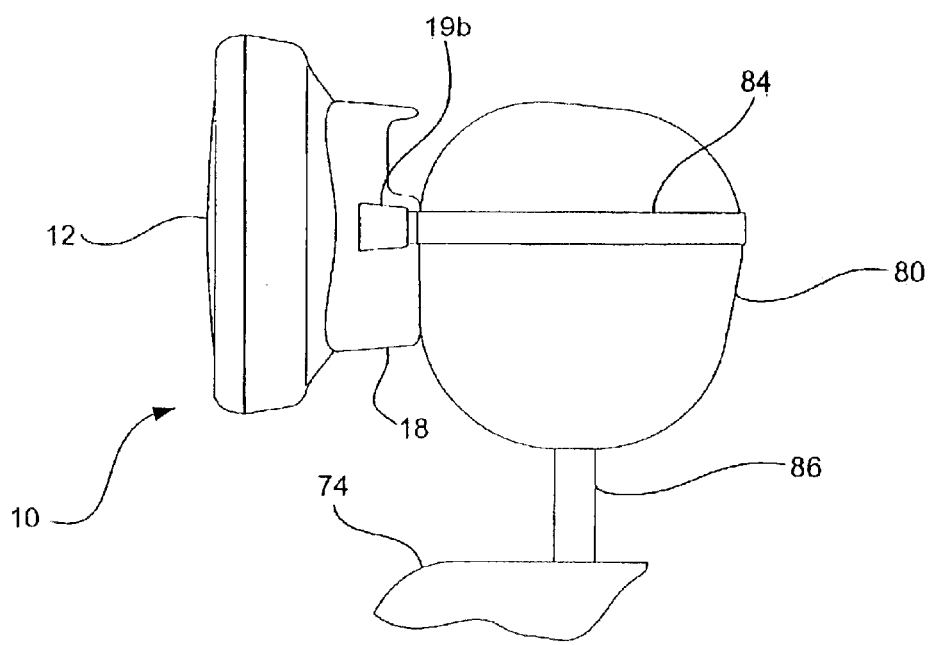
FIG. 7A is a side elevation view illustrating attachment the of the remote controlled mirror to a vehicle seat headrest with a strap.
Figure 7B:
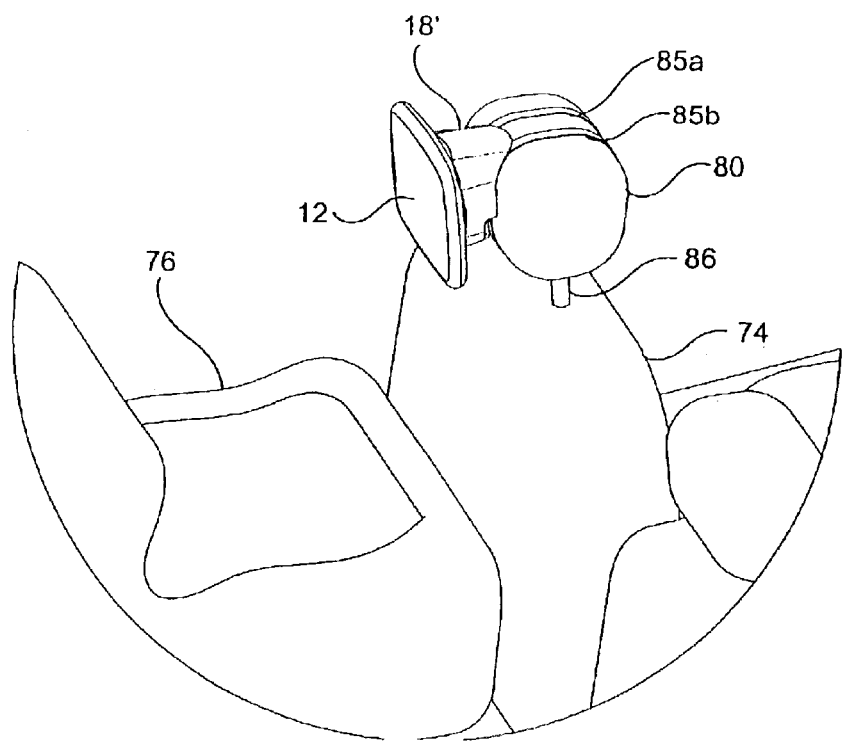
FIG. 7B is an isometric view illustrating an alternative approach for attaching the mirror to a vehicle seat headrest with straps.

FIG. 7A illustrates one preferred approach for attaching mirror 10 to a vehicle seat. One end of a nylon strap 84 is attached to mounting clip 19b of base 18. Nylon strap 84 is horizontally wrapped around headrest 80, and an opposite end of nylon strap 84 is attached to mounting clip 19a (not shown in this Figure). FIG. 7B illustrates another preferred technique for attaching mirror 10 to a vehicle seat. Two nylon straps 85a and 85b are vertically wrapped around headrest 80 of rear seat 74. Each nylon strap is routed through one or more brackets (not shown) on the back of a base 18', cinched tight, and secured around headrest 80 with conventional strap clips (not shown). Base 18' is optionally shaped to match the front surface contour of headrest 80.

Figure 8:
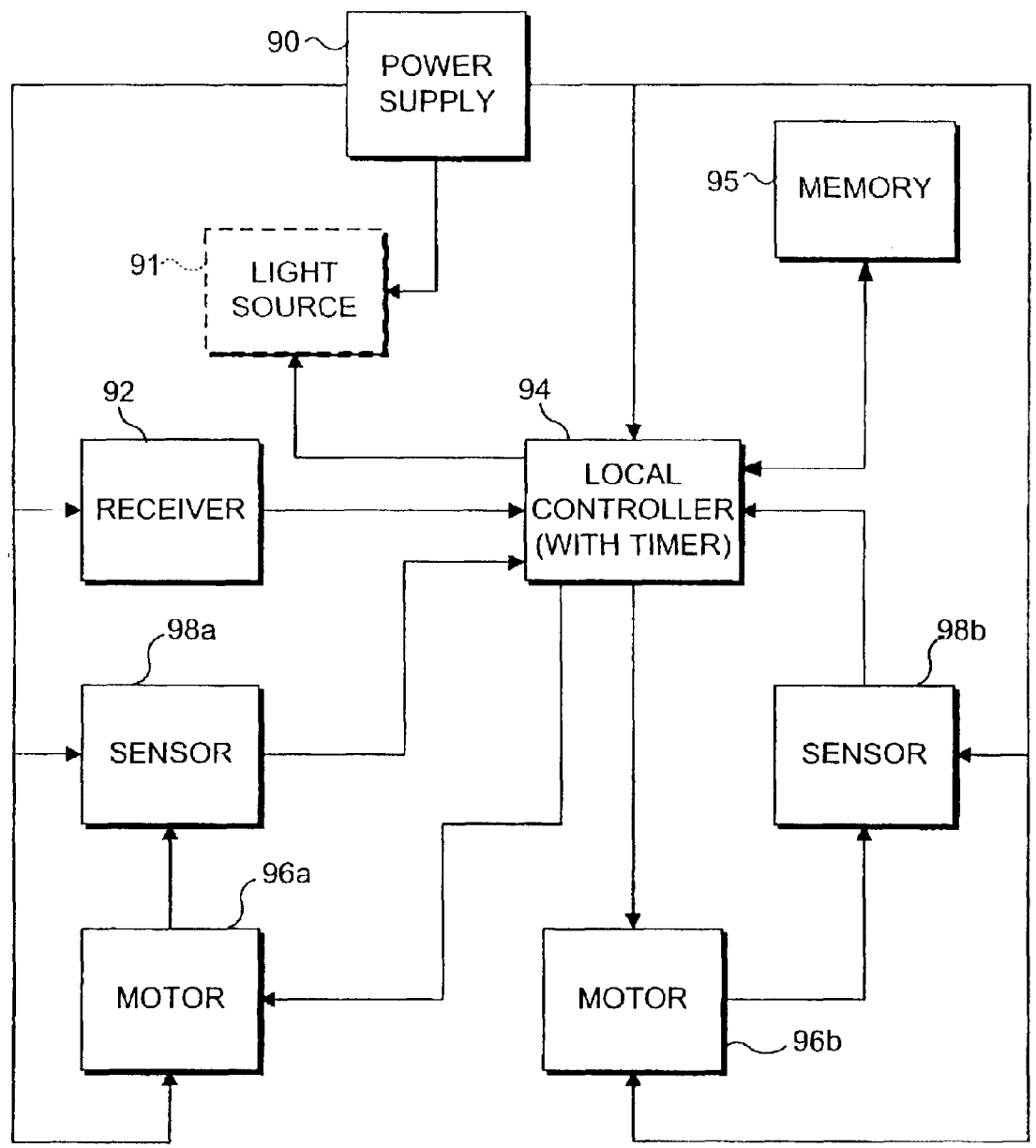
FIG. 8 is a functional block diagram of the wireless remote controlled mirror.

FIG. 8 is a block diagram of a preferred embodiment of an electrical circuit for mirror 10. A power supply 90 provides electrical power to all electrical components in the circuit that require power. Preferably, power supply 90 employs storage or rechargeable batteries; but optionally, it is also contemplated that power supply 90 can be energized with power drawn from the electrical system of a vehicle. For example, the mirror might be coupled to a cigarette lighter receptacle, to draw 12 volt direct current power from the vehicle battery/alternator (not shown). A receiver 92 receives a signal that was transmitted from a wireless remote controller (discussed below). Preferably, the signal is an RF signal, and receiver 92 is an RF receiver. However, those skilled in the art will recognize that an infrared receiver, microwave receiver, optical receiver, or other wireless signal receiver may by employed. Receiver 92 relays the signal to a local controller 94, which determines the type of command conveyed by the signal that was received. For example, the signal may convey a command that indicates a direction in which the reflective lens in mirror 10 is to move, or a defined position previously stored in memory to which reflective lens 12 is to be reoriented. Another command that can be indicated by the signal is a programming command that causes a current position of the reflective lens to be stored in memory. Optionally, memory 95 maybe used to store a plurality of previously set positions, in addition to storing machine instructions used for controlling local controller 94, and for storing other data. The commands can be pulse code modulated, or frequency shift keying, or may use other well known techniques for distinguishing between a limited set of commands conveyed by an RF signal or other type of signal. As another option, which is pertinent to another embodiment of the wireless remote controlled mirror described below, an optional light emitting source 91 can be selectively energized by the remotely transmitted signal from a wireless remote controller, to illuminate a subject being viewed in the reflective lens. A timer circuit (not separately shown) is included within local controller 94 to cause the light emitting source to turn-off after a predefined interval of time has elapsed.

Once local controller 94 determines the specific wireless command that was received, local controller 94 issues an appropriate drive signal to energize the prime mover, such as an electric motor 96a, which must cause the required movement to reorient the reflective lens. As described above, the motor causes its threaded shaft to rotate, which drives threads on the lens housing, thereby causing the lens housing to pivot. Preferably, electric motor 96a provides a driving force to move the motor housing in a selected direction about an axis that is orthogonal to the axis about which the driving force provided by electric motor 96b pivots the reflective lens. When electric motor 96a is energized, an optional sensor 98a detects motion of the lens housing. Sensor 98a may be any one of a number of conventional motion sensors, such as a potentiometer that detects rotation of the threaded shaft, an optical or magnetic sensor that detects pivoting of the lens housing, a timer that detects duration of motion, or a simple logic gate that only detects that motor 96a is energized. In turn, sensor 98a may optionally transmit a motion signal back to local controller 94 to provide a closed loop control; however, the user can monitor the orientation of the reflection in the reflective lens to provide the necessary closed loop control of the reflective lens orientation. Once receiver 92 no longer receives the transmitted wireless command from the wireless remote controller 100 or has achieved a position previously stored in memory, in accord with the command that was last transmitted, local controller 94 de-energizes the motor and motion of housing 14 and reflective lens 12 stops.

Figure 9:
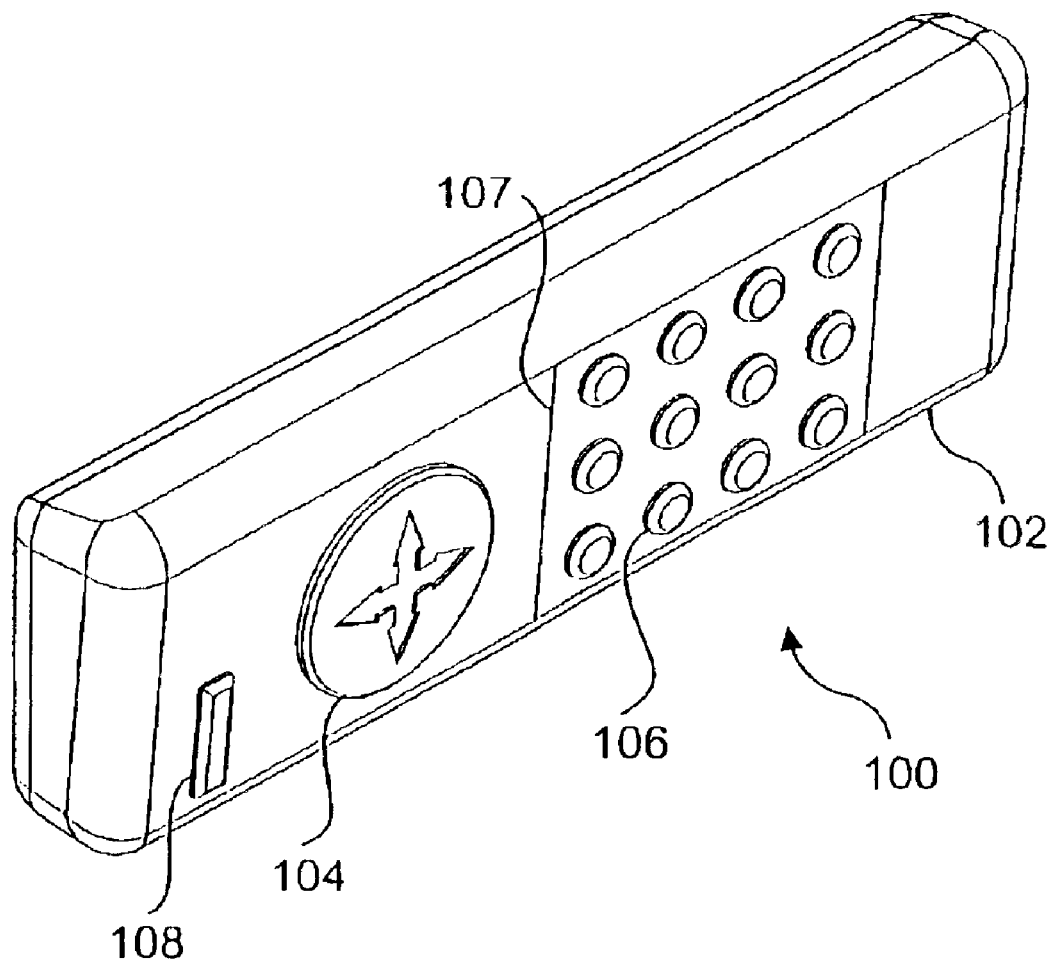
FIG. 9 is an isometric view of a wireless remote controller for use in controlling the orientation of the mirror.

A wireless remote controller 100 shown in FIG. 9 is preferably similar in shape and size to a key fob, such as those used to wirelessly, remotely lock and unlock a vehicle. Also, wireless remote controller 100 is preferably sized and shaped to be stored in channel 20 (shown in FIG. 2) when the mirror and remote controller are removed from the vehicle. A housing 102 of the remote controller is preferably made of a plastic material with a volume sufficient to contain a battery used for a power supply (not shown), a small circuit board (discussed below), and a four-position rocker switch 104. Preferably, wireless remote controller 100 transmits an RF signal that conveys different commands to the mirror. However, those skilled in the art will recognize that an infrared signal, a microwave signal, an optical signal, or other wireless signal may instead be employed.

Preferably, a four-position rocker switch 104 is used to control the desired directional orientation of reflective lens 12 in mirror 10. However, an additional keypad 107 can be provided to enable other types of commands or functions to be selected by a user. For example, pressing a keypad button 106 may cause wireless remote control 100 to transmit a signal, commanding an incremental position change of the mirror lens relative to one or both of the orthogonal axes of the mirror housing. Alternatively, specific keypad buttons on keypad 107 can be assigned to different previously set positions of the reflective lens that have been stored in the memory of mirror 10. For example, when one keypad button A is pressed, a signal is transmitted to the mirror commanding the reflective lens to move to a previously stored position assigned to keypad button A for use by a tall driver. Another position of the reflective lens might be stored in the memory for and assigned to a keypad button B for use by a short driver of the vehicle. In this manner, the setup time required to properly orient reflective lens 12 when either the short driver or the tall driver drives the vehicle after the other driver is substantially shortened. It would not be necessary to reorient the mirror incrementally each time that a different driver uses mirror 10 in the vehicle, following its use by another driver. This function is somewhat like that provide by a memory seat position in modern cars that enables a driver to select an assigned button that returns the seat and other driver specific setting to previously stored conditions. Another keypad button may enable a user to activate or deactivate an optional light (not shown) on the mirror.

In addition, remote controller 100 may include an optional indicator 108 that is a LED used to indicate that transmission of a wireless command signal is in progress. Alternatively, indicator 108 may be continuously lighted or blink in a specific pattern to indicate that power is available, or conversely, that battery power is low. Those skilled in the art will recognize that a variety of other buttons, keypad configurations, and/or other features may be included on the wireless remote controller 100. Such features may include operation as a universal remote control to control a door locking system, a panic button for sounding an alarm, a garage door opener, etc. It is also contemplated that dual mirrors 10 can be controlled with a single remote controller that is provided with a selector switch (not shown) to enable a user to select one of two different mirrors 10 that will be controlled with the signals transmitted from the remote controller.

Figure 10:
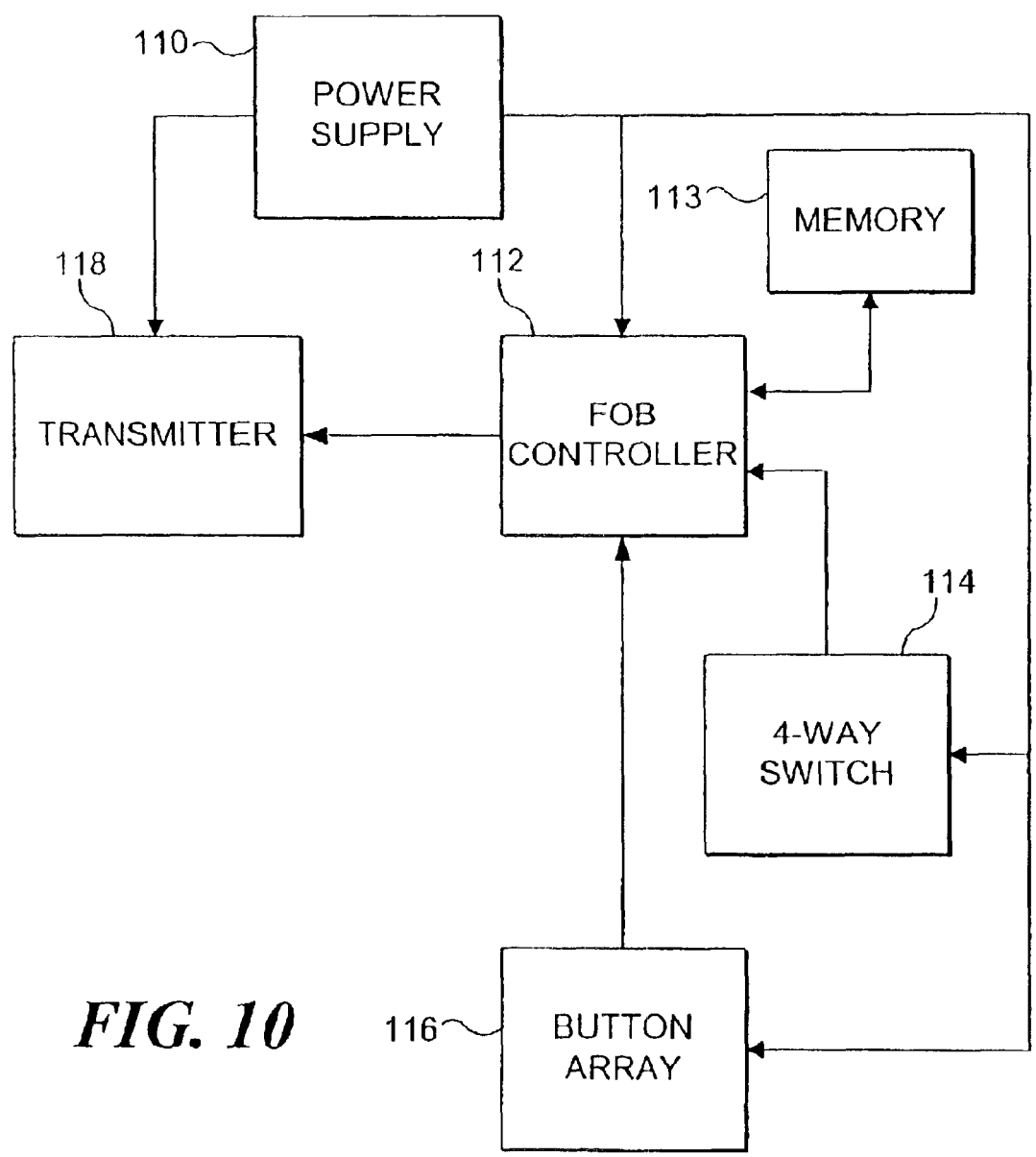
FIG. 10 is a block diagram of the wireless remote controller.

FIG. 10 is a block diagram of a preferred embodiment of an electrical circuit for wireless remote controller 100. A power supply 110 includes a storage or rechargeable battery that provides electrical power to all electrical components in the circuit that require such power. When a user indicates a desired direction by activating a four-way switch 114, the four-way switch selects the corresponding signal transmitted and a fob controller 112 provides the appropriately encoded signal to convey that command to a transmitter 118. Alternatively, one of the buttons on a button array 116 (corresponding to keypad 107) is activated by the user to indicate a command signal that fob controller 112 will cause transmitter 118 to transmit. Fob controller 112 determines the type of command that will be transmitted in response to the user action and controls transmitter 118, causing the transmitter to transmit that command. An optional memory 113 is used to store previously defined positions, options, machine instructions for fob controller 112, and other data. One of the commands transmitted can be a command to turn on a light emitting source on a wireless remote controlled mirror, which is discussed in greater detail below, in connection with an embodiment that includes such a light emitting source.

FIGS. 11–18 illustrate other preferred embodiments for mounting the wireless remote controlled mirror to an object. FIG. 11 illustrates a clamp 120 that enables the mirror to be clamped to a child safety seat, or to a vehicle seat, or to some other object. It is contemplated that mirror 10 might be mounted to objects not used in a vehicle, such as to a shelf, a playpen, a swimming pool, a boat dock, or any other object suitable for supporting the mirror to view a desired location. Clamp 120 is preferably connected to base 18 by a semi-rigid, but flexible gooseneck 122. Gooseneck 122 enables coarse positioning of the mirror so that it is directed generally as desired, whereas the mirror provides fine positioning through its remote control functionality. Those skilled in the art will recognize that clamp 120 may be directly attached to base 18, or may be connected to base 18 in a variety of other ways.

FIG. 12 illustrates a suction cup 124 that enables the mirror to be mounted to a smooth surface 126. Suction cup 124 is preferably fabricated of an elastomeric material and is open on one side and shaped as a concave cup. Smooth surface 126 may include a window, a mirror, an appliance surface, a wall, or other surface sufficiently smooth to maintain a vacuum seal with suction cup 124. Suction cup 124 may optionally include a suction control/release 128 that enable a user to break the vacuum seal formed between suction cup 124 and smooth surface 126, so that the mirror can be released from the smooth surface. Also, suction cup 124 is preferably connected to base 18 with gooseneck 122 to facilitate coarse positioning of the mirror.

FIG. 13 illustrates an adhesive layer 130 that enables the mirror to be adhesively secured to an object or surface. Adhesive layer 130 comprises an appropriate adhesive material 132 applied to base 18. A permanent or reusable adhesive material 132 is employed that adheres to an object or surface, such as an exterior surface of a vehicle or a boat.

FIG. 14 illustrates a mounting plate 134 that enables the mirror to be more permanently mounted to an object or surface. Mounting plate 134 is preferably attached to an object or surface with one or more fasteners, such as threaded screws 136a and 136b. Mounting plate 134 is preferably connected to base 18 via a stem 140 and pivot joint 142. Stem 140 is preferably a hollow or solid rod. Joint 142 preferably enables mirror 10 to pivot in one or more degrees of freedom when sufficient force is applied (by hand), but to otherwise remain fixed in a coarse position selected by the user. For example, joint 142 may be a friction hinge, a ball joint, a "U" joint, or other mechanism that is adjustable, but will retain its position.

FIG. 15 illustrates a mounting stand 144 that enables the mirror to be placed on a table top, shelf, floor, or other horizontal surface. Mounting stand 144 is preferably attached to base 18 via one or more pivot hinges 146.

FIG. 16 illustrates a wireless remote controlled mirror 150 employed as a side rear-view mirror 150 mounted on the exterior of a vehicle 152. This embodiment can be used as a replacement for a manually adjusted side rear-view mirror or added to a vehicle originally purchased without a side rear-view mirror. This illustration is simply exemplary, since other techniques can be used to mount the side rear-view mirror to an external surface of a vehicle.

Figure 17:
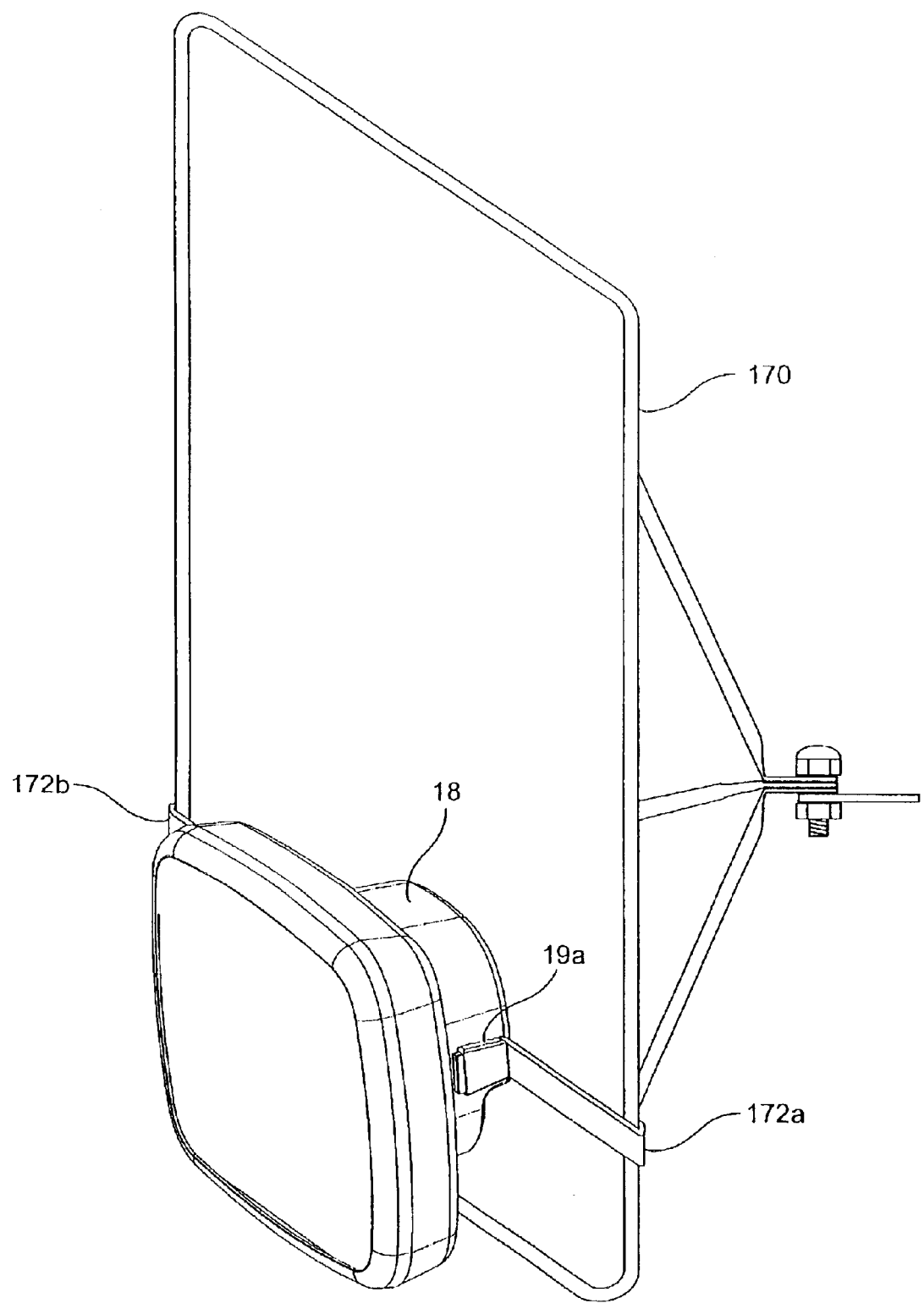
FIG. 17 is a side elevational view of the wireless remote controlled mirror mounted as an auxiliary mirror on a truck side rear-view mirror.

FIG. 17 illustrates the wireless remote controlled mirror mounted to a side rear-view truck mirror 170. Metal or plastic brackets 172*a* and 172*b* mount base 18 to the front lower portion of truck mirror 170. An end of bracket 172*a* is inserted into clip 19*a* of the wireless remote controlled mirror. Similarly, bracket 172*b* is attached to truck mirror 170 and inserted into clip 19*b* (not shown). Those skilled in the art will recognize that other mounting brackets may be employed to couple the wireless remote controlled mirror to truck mirror 170, or to replace truck mirror 170 using a suitable mounting frame.

Figure 18:
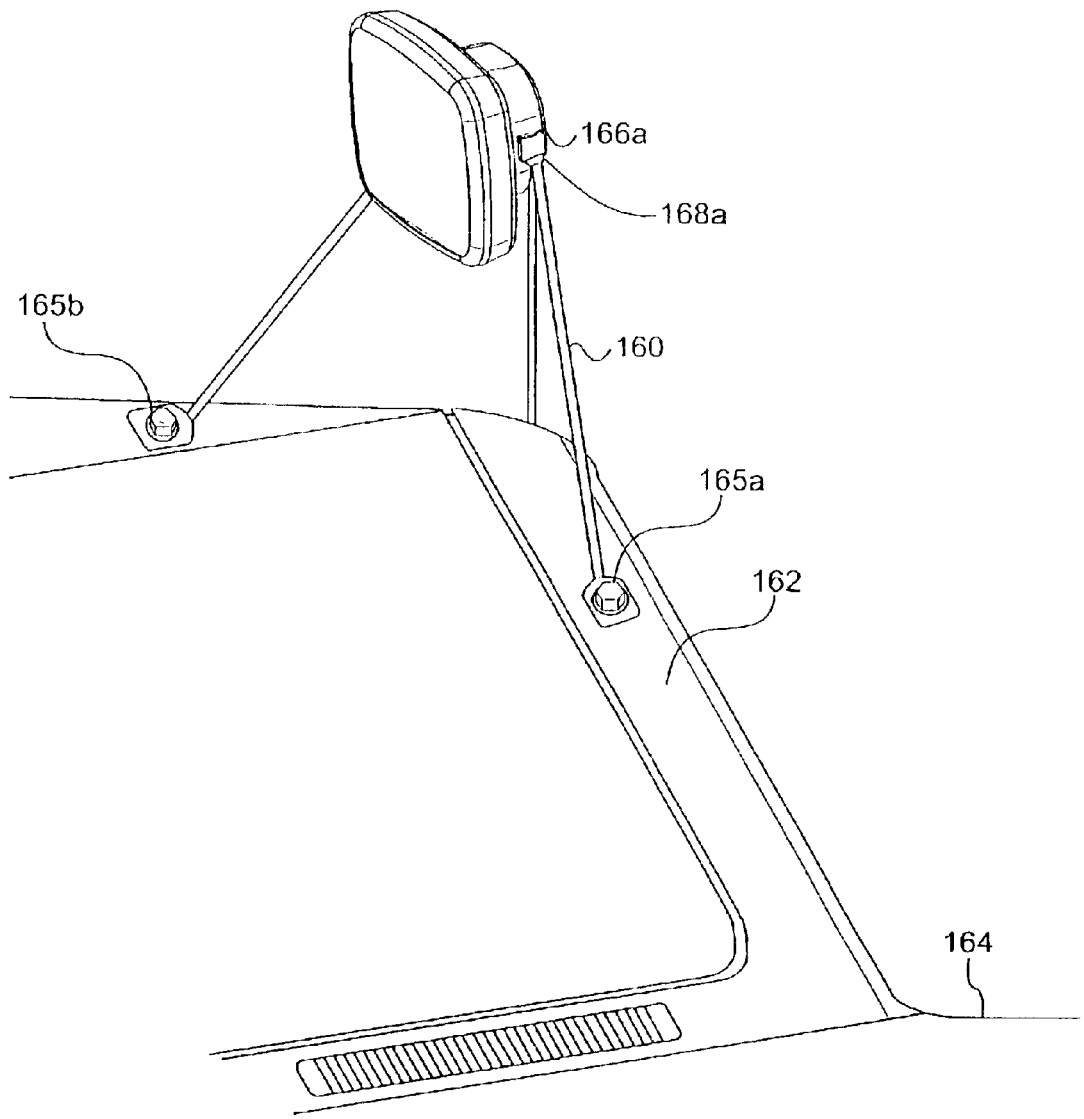
FIG. 18 is a side elevational view of the wireless remote controlled mirror mounted to the front of a vehicle using a mounting frame.

FIG. 18 illustrates a mounting frame 160 that enables the wireless remote controlled mirror to be attached to an object, such as a hood area 162 of a bus 164. Mounting frame 160 may be attached to bus 164, or other object, in any conventional manner, such as with bolts 165*a*, 165*b* and 165*c* (not shown). This embodiment can enable a user to wirelessly remotely control the view of persons passing in front of or behind a vehicle, or controllably view traffic around a corner.

Similarly, mounting frame 160 could be attached to a wall at an intersection of two hallways, or to a surface in a retail store overlooking a display of merchandise, enabling a user to wirelessly remotely control the view of persons or other moving objects around a corner to prevent collisions in the first instance, and to view anyone pocketing merchandise in the second instance. A mounting slot 166*a* that is attached to base 18 accepts a mounting flange 168*a* that is formed at an end of mounting frame 160. Other mounting slots and mounting flanges (not shown) are used to attach the wireless remote controlled mirror to mounting frame 160. Each mounting slot and flange may be further secured together with fasteners, adhesive, or other means. Those skilled in the art will also recognize that any of the above mounting means, or other suitable techniques may be used to mount the wireless remote controlled mirror to mounting frame 160. Also, the embodiments of FIGS. 16–18 may optionally be connected to a vehicle's electrical system with a single wire that extends from a suitable fuse connected to the +12 volt direct current supply of the vehicle, and to the power supply in the mirror. If the mirror mounts on the vehicle with a metal contact, such as a fastener into the sheet metal, a separate ground connection wire will not be required.

Mirror with Integral Lighting

Figure 19:
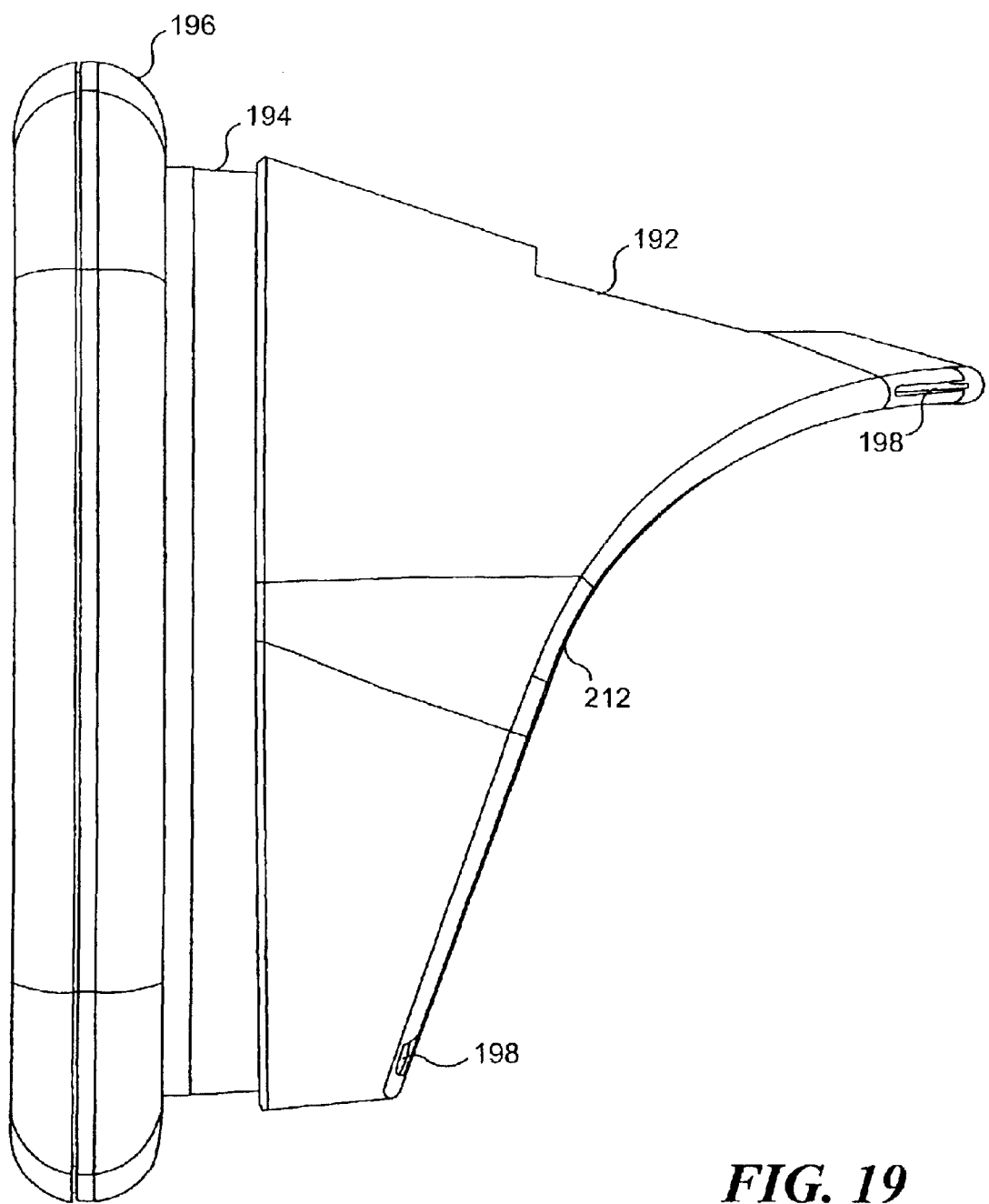
FIG. 19 is side elevational view of another embodiment of a wireless remote controlled mirror that includes integral lights.
Figure 20:
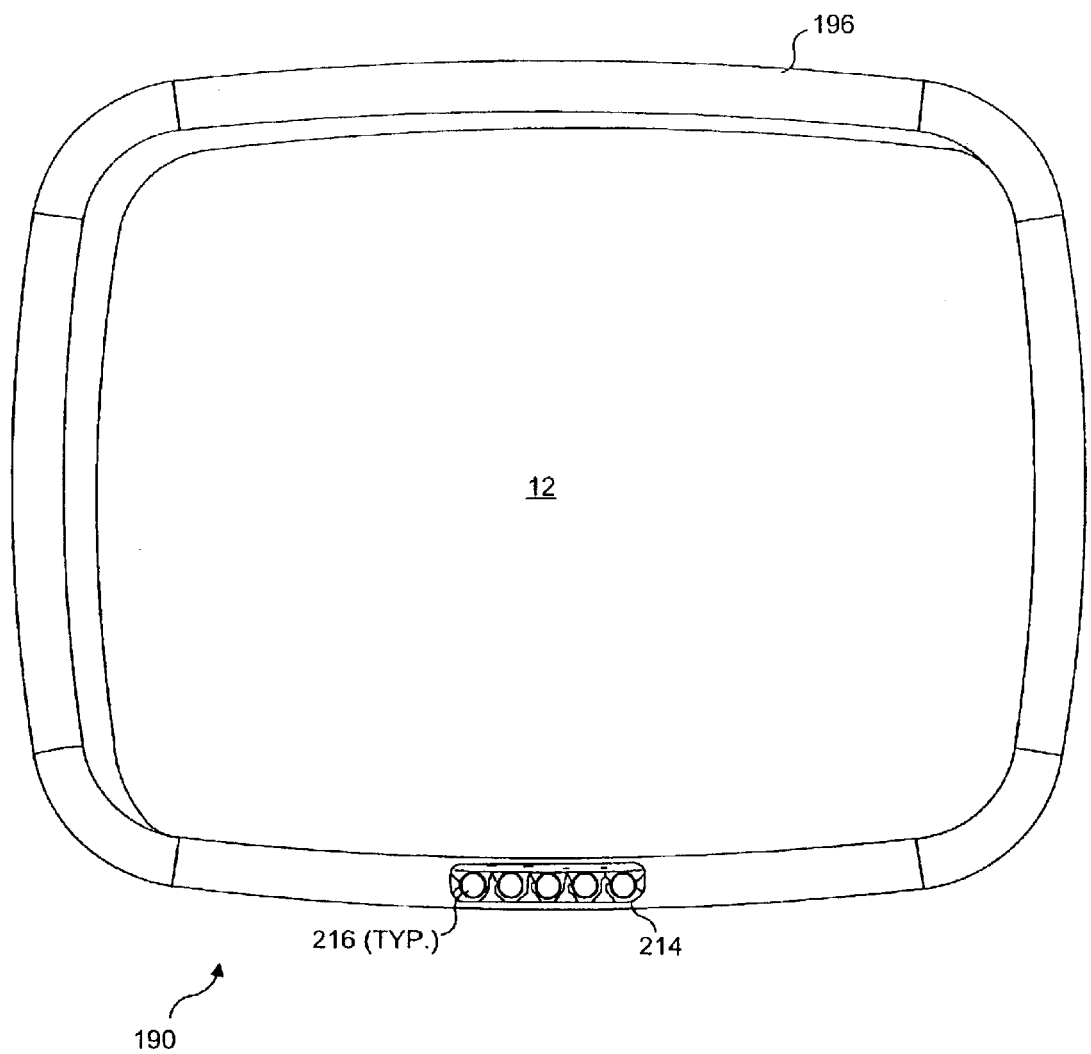
FIG. 20 is a front elevational view of the embodiment of FIG. 19.
Figure 21:
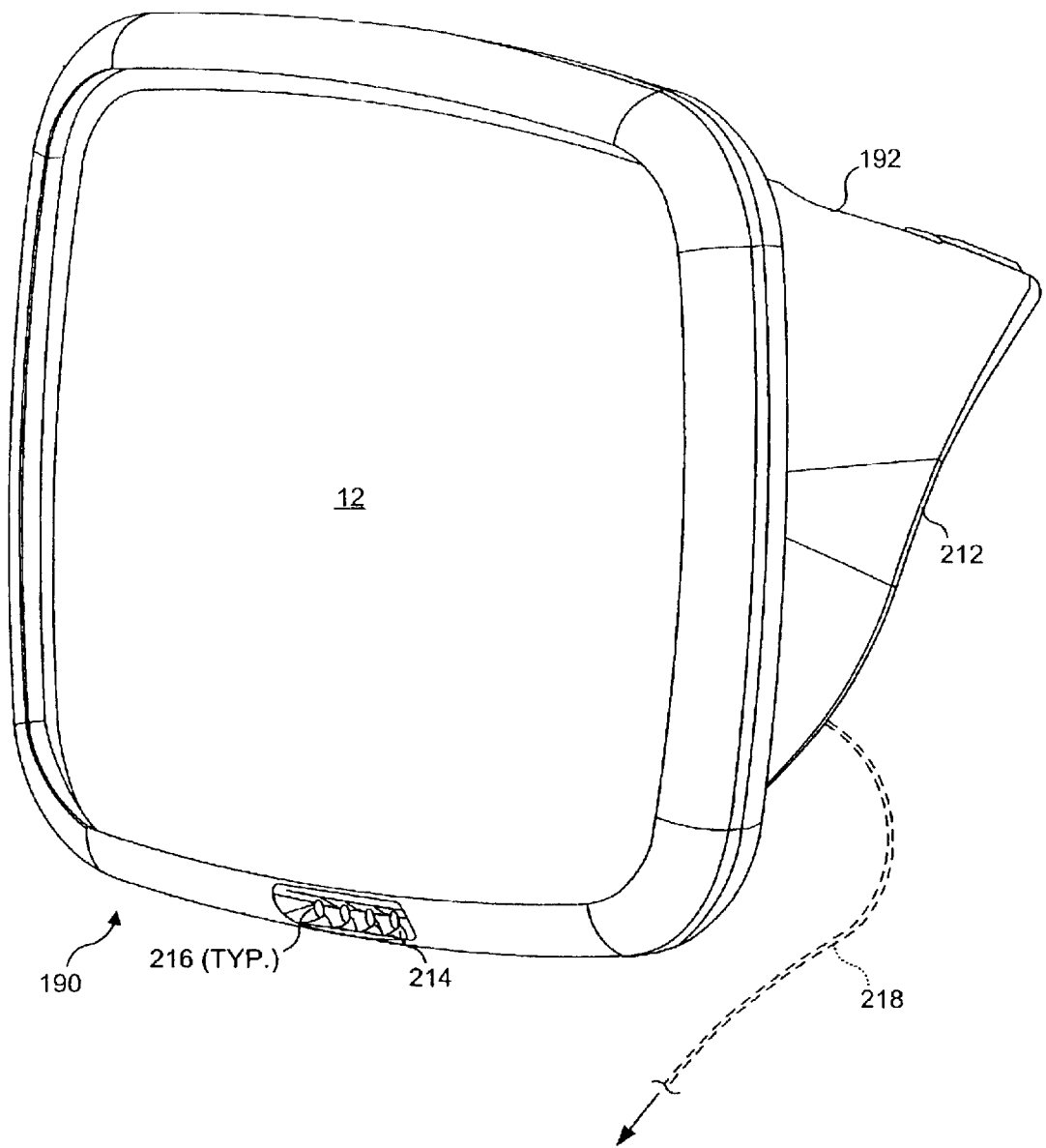
FIG. 21 is a front isometric view of the embodiment of FIG. 19.

Another embodiment of a wireless remote controlled mirror (i.e., "mirror") 190 is shown in FIGS. 19, 20, and 21. It will be understood that the details of mirror 190 that are not discussed herein will be presumed to be identical to the corresponding details of mirror 10. For example, mirror 190 employs the same drive mechanism to move reflective lens 12 (shown in FIGS. 20 and 21) to different desired orientations relative to a base 192. Base 192 is coupled through a housing 194 to a bezel 196 in which reflective lens 12 is mounted, so that the bezel and reflective lens can pivot relative to two orthogonal axes, i.e., vertically and horizontally relative to base 192. The internal operative configuration of bezel 196, housing 194, and base 192 are generally as discussed and shown for these corresponding components in regard to the preceding embodiments and need not be repeated herein.

Although details of a vehicle are not shown, base 192 includes a contoured surface 212 that is adapted to mount against a headrest of a rear seat in a vehicle, so that reflective lens 12 is facing generally forward. Straps (not shown) are threaded through slots 198 and looped around the headrest to firmly secure base 192 in position on the headrest.

As shown in FIGS. 20 and 21, the lower forward facing portion of bezel 196 includes a plurality of spaced-apart light emitting sources 216 disposed within a reflective recess 214, adjacent to reflective lens 12. Preferably, light emitting sources 216 comprise LEDs that emit substantially white light. However, it will be understood that other types of light emitting sources can alternatively be used within the scope of the present invention. For example, one or more incandescent, fluorescent, phosphorescent, laser, or other light sources can instead be used. The light sources can also be alternatively disposed at one or more other location, so long as the light emitted thereby is directed toward an object or person being viewed in the reflective lens, to illuminate the object or person. It will be apparent that the light emitted by light emitting sources 216 will greatly improve the visibility of a child in a rear facing car seat, when the child is in a relatively dark interior of a vehicle, for example, after dark. Reflective recess 214 is shaped so as to focus the light from the light emitting sources toward a desired subject, to improve the visibility of the subject when the subject is viewed in reflective lens 12. Since the reflective lens and bezel 196 move together as an integral unit when the reflective lens is remotely repositioned, the light from the light emitting sources will generally always be directed toward the subject being viewed.

It will generally be preferable to energize light emitting sources 216 with electrical current provided by the battery power supply that energizes the electrical motors and other components used in remotely repositioning reflective lens 12. However, it is also contemplated that the electrical current for energizing those components of mirror 190 and the light emitting sources can alternatively (or in addition) be provided by the electrical system of the vehicle in which mirror 190 is mounted for use. An optional electrical power cord 218 is illustrated in FIG. 21 and will typically be coupled to a conventional cigarette lighter receptacle adapter and inserted into an available cigarette lighter receptacle within the vehicle. Electrical power from the vehicle can then be applied to mirror 190 to energize all of its electrically powered components, including light emitting sources 216. It is also contemplated that electrical power cord may be so connected only intermittently, as required to charge rechargeable batteries (not shown) within base 192. After being charged, these batteries can provide the required electrical current to energize the electrical components of mirror 190.

Figure 22A:
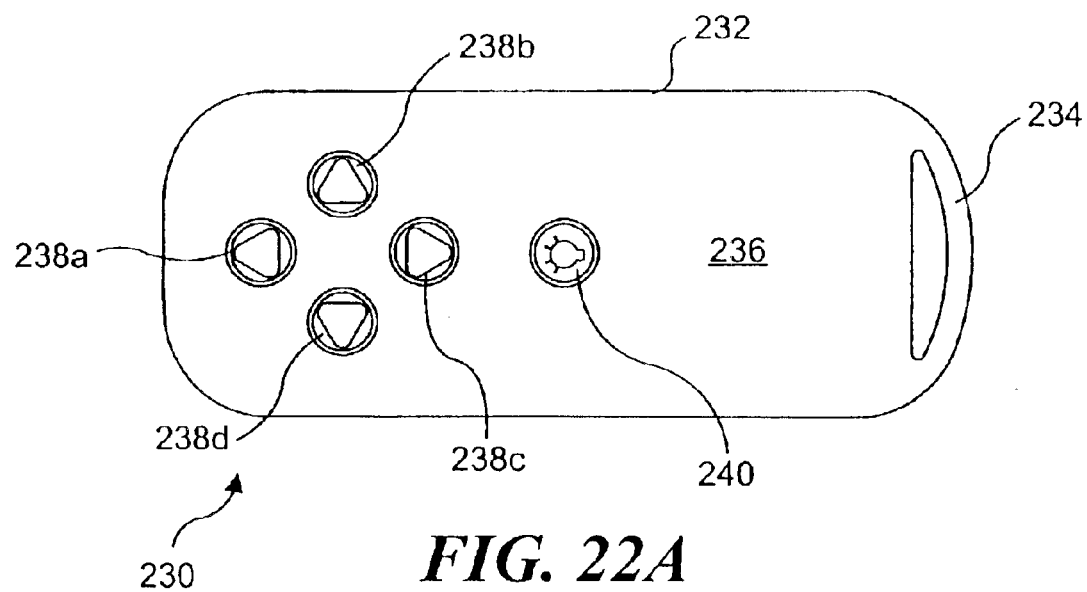
FIG. 22A is a top plan view of a remote control for use with the embodiment of FIG. 19.
Figure 22B:
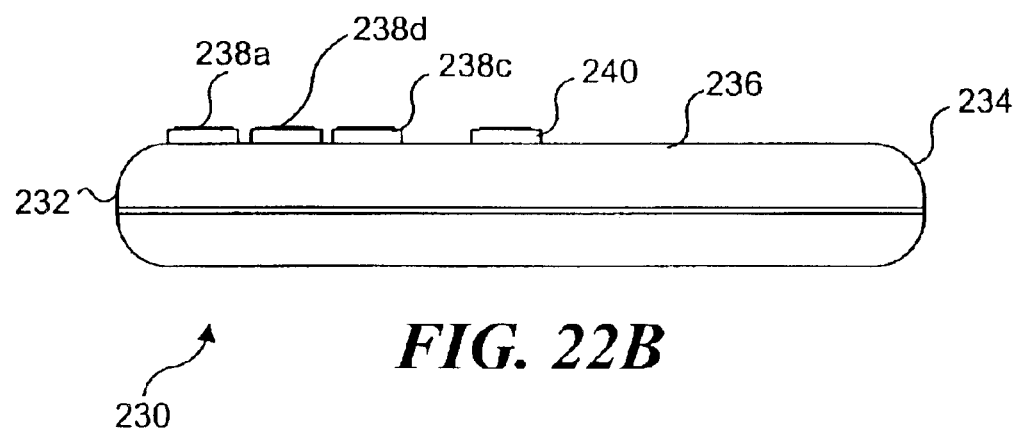
FIG. 22B is a side elevational view of the remote control of FIG. 22A.

FIGS. 22A and 22B illustrate a remote control 230 for mirror 190. Remote control 230 includes the same transmitter 118 and other components as remote control 100, which was discussed above. A housing 232 includes a keychain loop 234 at one end, through which a keychain or ring can be inserted to enable the remote control to be carried with the keys for a vehicle and thus, to be readily available hanging from the ignition switch when the vehicle key is inserted while operating the vehicle. A top surface of housing 232 on remote control 230 includes four directional buttons 238a, 238b, 238c, and 238d. When one of these directional buttons is depressed, reflective lens 12 is caused to pivot in the corresponding direction in response to the signal transmitted from remote control to mirror 190, generally as discussed above. In addition, top surface 236 includes a remote light button 240 that can be depressed by a user to remotely cause light emitting sources 216 to be energized. Each time that remote light button is depressed, light emitting sources 216 are energized for a predetermined interval of time, e.g., five seconds, but the light emitting sources will remain energized as long as the remote light button is held depressed.

Other schemes for controlling the light emitting sources remotely can alternatively be used. For example, remote light button 240 can be omitted from remote control 230 if the remote control is changed so that it always transmits a signal to energize the light emitting sources for a predefined time interval each time that any of directional buttons 238a–238d is activated. Or, the receiving circuit in mirror 190 can be modified to energize the light emitting sources anytime that a signal is received to reorient the reflective lens.

Although the present invention has been described in connection with the preferred form of practicing it and modifications thereto, those of ordinary skill in the art will understand that many other modifications can be made to the invention within the scope of the claims that follow. For example, any of the above mounting methods and components that enable coarse positioning of the mirror may be intermixed. Also, the wireless remote controller may be integrated into a vehicle, such as on a dashboard or door, eliminating the need for wiring to be routed to mirror 10, as would be the case for a conventional wired side rear-view mirror controller and its side rear-view mirror. Accordingly, it is not intended that the scope of the invention in any way be limited by the above description, but instead be determined entirely by reference to the claims that follow.

The invention in which an exclusive right is claimed is defined by the following:

1. A wireless remote controlled mirror, comprising:
    (a) a base adapted to attach to an object;
    (b) a prime mover mounted on the base;
    (c) a reflective lens mounted in a housing and drivingly coupled to the prime mover;
    (d) a light source supported by the base, said light source being energized to emit light; and
    (e) a receiver in electrical communication with the prime mover, said receiver being adapted to couple to an electrical power source and adapted to detect a wireless command signal from a remote controller that is activated by a user, said receiver controlling the prime mover in response to the wireless command signal, to cause the prime mover to drive the reflective lens and the light source to a desired orientation.

2. The wireless remote controlled mirror of claim 1, wherein the light source comprises a plurality of discrete spaced-apart light emitting sources.

3. The wireless remote controlled mirror of claim 1, wherein the light source is disposed in the housing in which the reflective lens is mounted, so that the light source moves with the reflective lens when driven by the prime mover.

4. The wireless remote controlled mirror of claim 1, wherein the light source comprises a plurality of light emitting diodes that emit light that is substantially white.

5. The wireless remote controlled mirror of claim 1, wherein the receiver includes a control circuit to selectively activate the light source in response to the wireless command signal.

6. The wireless remote controlled mirror of claim 5, wherein the control circuit includes a timer circuit to deactivate the light source after a predefined time interval, so that when selectively activated, the light source only remains energized for the predefined interval.

7. The wireless remote controlled mirror of claim 1, further comprising a battery power supply that provides electrical current to energize the prime mover, the receiver, and the light source.

8. The wireless remote controlled mirror of claim 1, further comprising a power supply that is adapted to be removably coupled to an external power source.

9. The wireless remote controlled mirror of claim 1, wherein the base is adapted to attach to one of a fixed and a removable component used with a vehicle, enabling a front-facing driver of the vehicle to remotely control the reflective lens to view a rear-facing passenger disposed behind a front seat of the vehicle, when the reflective lens is remotely controlled to achieve the desired orientation, said light source being selectively energizable to illuminate a rear-facing passenger.

10. The wireless remote controlled mirror of claim 1, further comprising an additional prime mover that is mounted to the base and is in electrical communication with the receiver, said prime mover pivoting the reflective lens and the light source about a first axis and said additional prime mover pivoting the reflective lens and the light source about a second axis that is generally orthogonal to the first axis, in response to the wireless command signal.

11. The wireless remote controlled mirror of claim 1, wherein the receiver comprises one of a radio frequency receiver, an infrared receiver, a microwave receiver, and an optical receiver.

12. The wireless remote controlled mirror of claim 1, wherein the remote controller comprises:
    (a) a power supply;
    (b) a wireless transmitter connected to the power supply;
    (c) a light source switch connected between the power supply and the wireless transmitter, such that when the light source switch is activated, the wireless transmitter transmits the wireless command signal to the receiver to cause the light source to be energized; and
    (d) a position switch connected between the power supply and the wireless transmitter, such that when the position switch is activated, the wireless transmitter transmits the wireless command signal to the receiver indicating a direction in which the reflective lens and the light source are to be moved.

13. A method for controllably positioning a mirror and a light source coupled to the mirror relative to a base, comprising the steps of:
    (a) enabling a user to select a direction in which the mirror and the light source are to be reoriented;
    (b) in response to the direction selected by the user, transmitting a wireless command signal indicative of the direction selected; and
    (c) in response to receiving the wireless command signal at the mirror, reorienting the mirror and the light source relative to the base in the direction selected by the user.

14. The method of claim 13, further comprising the step of enabling the user to selectively energize the light source.

15. The method of claim 14, wherein the step of selectively energizing includes the step of energizing the light source for a predefined period of time each time that the light source is selectively energized.

16. The method of claim 13, wherein the step of enabling the user to select the direction comprises the step of enabling the user to select one of four orthogonal directions in which the mirror and the light source are to be reoriented relative to the base.

17. The method of claim 13, further comprising the step of enabling the user to mount the mirror so as to view a rear-facing passenger disposed behind a front seat in a vehicle.

18. The method of claim 17, further comprising the step of remotely controlling the light source to selectively energize it.

19. The method of claim 18, further comprising the step of reorienting the mirror and the light source so that light emitted by the light source illuminates the rear-facing passenger to enable said passenger to be viewed in a darkened vehicle.

20. The method of claim 17, further comprising the step of enabling a user to energize the light source with electrical power from an electrical system of the vehicle.

21. The method of claim 13, further comprising the step of providing the user a portable transmitter and switch for transmitting the wireless command signal.

22. The method of claim 21, further comprising the step of providing a switch on the portable transmitter that is activatable to selectively energize the light source with the wireless command.

23. A system for providing a view of a rear-facing person that is visible to a front-facing person within a vehicle, even though an interior of the vehicle is dark, comprising:

(a) a transmitter adapted to be controlled by a front-facing person, to transmit a wireless signal indicating a desired adjustment to a reflected view of a rear-facing passenger, and selectively indicating that a rear-facing person should be illuminated to be more visible;

(b) a receiver disposed within a base that is spatially separate from the transmitter, said receiver being adapted to receive the wireless signal transmitted from the transmitter;

(c) a reflective lens for use in providing a reflected view of a rear-facing person;

(d) a light source that is selectively energized to illuminate a rear-facing person; and (e) a first prime mover that is controlled by the receiver in response to the wireless signal, said first prime mover being drivingly coupled to the reflective lens and adapted to move the reflective lens and the light source about a first axis relative to the base, in response to the wireless signal, to an orientation controlled by a user with the transmitter.

24. The system of claim 23, further comprising a second prime mover that is controlled by the receiver in response to the wireless signal, said second prime mover being drivingly coupled to the reflective lens and adapted to move the reflective lens and the light source about a second axis relative to the base, in response to the wireless signal, to an orientation controlled by a user with the transmitter.

25. The system of claim 23, wherein the transmitter includes a light source activation switch and a multi-position switch that control the wireless signal, said wireless signal being indicative of a selected position in which the multi-position switch is activated by a user, to control an orientation of the reflective lens about one of the first and the second axes, and indicating whether the light source is to be energized.

26. The system of claim 23, wherein the light source comprises a plurality of spaced-apart light emitting sources disposed adjacent to the reflective lens, so that said plurality of light emitting sources move with the reflective lens.

27. The system of claim 23, further comprising a battery power supply for providing an electrical current to energize the first prime mover and the light source.

28. The system of claim 23, further comprising a cord and a connector adapted to couple to a vehicle electrical system to provide an electrical current to energize the first prime mover and the light source.

* * * * *